(12) United States Patent
Lewis

(10) Patent No.: US 8,283,427 B2
(45) Date of Patent: Oct. 9, 2012

(54) HETEROGENEOUS PERFLUOROARYL SUBSTITUTED LEWIS ACID CATALYSTS FOR CATIONIC POLYMERIZATIONS

(76) Inventor: Stewart P. Lewis, Radford, VA (US)

( * ) Notice: Subject to any disclaimer, the term of this patent is extended or adjusted under 35 U.S.C. 154(b) by 223 days.

(21) Appl. No.: 12/774,764

(22) Filed: May 6, 2010

(65) Prior Publication Data
US 2011/0275773 A1 Nov. 10, 2011

(51) Int. Cl.
*C08F 4/44* (2006.01)

(52) U.S. Cl. ........ 526/127; 526/209; 526/212; 526/216; 526/217; 526/220; 526/336; 526/339; 526/189; 526/154

(58) Field of Classification Search ................ 526/127, 526/209, 212, 216, 217, 220, 336, 339, 189, 526/154
See application file for complete search history.

(56) References Cited

U.S. PATENT DOCUMENTS

| | | | |
|---|---|---|---|
| 5,648,580 A | 7/1997 | Chen | |
| 5,668,232 A * | 9/1997 | Langstein et al. | 526/189 |
| 6,043,180 A | 3/2000 | Jacobsen | |
| 6,620,898 B2 | 9/2003 | Webb | |
| 6,838,539 B2 | 1/2005 | Hogan | |
| 7,309,677 B2 | 12/2007 | Jacobsen | |
| 2005/0119114 A1* | 6/2005 | Ashe, III et al. | 502/152 |
| 2008/0269440 A1* | 10/2008 | Faust et al. | 526/131 |

* cited by examiner

*Primary Examiner* — Robert D. Harlan
(74) *Attorney, Agent, or Firm* — Renner Kenner Greive Bobak Taylor and Weber

(57) ABSTRACT

A process for cationically polymerizing olefin monomers in a reaction mixture includes the step of contacting olefin monomers and a catalytically effective amount of an initiating composition containing (A) a heterogeneous perfluoroaryl substituted Lewis acid coinitiator selected from the group consisting of open chain and cyclic aluminoxane compounds or Group 13 perfluoroaryl Lewis acid compounds of formula (III) and (B) an initiator selected from the group consisting of (i) organic compounds, (ii) halogens, (iii) interhalogens; (iv) Brönsted acids, (v) boron halides; (vi) silicon compounds; and (vii) germanium compounds. A novel initiator system is further disclosed.

14 Claims, No Drawings

HETEROGENEOUS PERFLUOROARYL SUBSTITUTED LEWIS ACID CATALYSTS FOR CATIONIC POLYMERIZATIONS

TECHNICAL FIELD

Generally, the present invention relates to initiator systems and their application in cationic polymerization of olefin monomers. More particularly, the present invention relates to initiator systems containing heterogeneous perfluoroarylated or perfluoroaryl-substituted Lewis acid coinitiators that are amenable to multiple batch and/or continuous polymerization processes.

BACKGROUND OF THE INVENTION

Acid catalysts find use in a broad range of industrially important processes including but not limited to cracking, isomerization, alkylation, acylation, and polymerization. Many of these processes are significantly advanced in terms of their chemistry; however, room for improvement still exists. In particular, one of the main limitations of acid catalysts is that many operate efficiently only under homogeneous conditions. As a result, in a majority of instances it becomes difficult if not impossible to separate the catalyst from the reaction mixture; thus, catalyst is consumed upon workup of the reaction mixture and isolation of the product. From this standpoint, these processes are wasteful in terms of materials and are not environmentally beneficial. A need exists for acid catalysts that possess a high degree of efficacy while operating under heterogeneous conditions as to preclude contamination of the reaction mixture with catalyst residues and increase overall utilization of the catalyst. This invention is aimed at these goals in addition to others.

The need for such heterogeneous acid catalysts is best illustrated in the field of cationic polymerization; in particular the production of isobutylene based polymers and most specifically polyisobutylene (PIB) and butyl rubber. The molecular weight (MW) of polymers produced by cationic methodologies is limited by a process known as chain transfer (CT). In cationic olefin polymerization, CT involves β-deprotonation of the propagating carbocationic chain end of growing polymer with concomitant formation of a new carbocation capable of initiating further growth. CT is suppressed in relation to propagation by conducting polymerizations at reduced temperatures as the activation energy for the former process greatly exceeds that for the later. CT can also be reduced by using high monomer concentration, polar solvents, and weakly coordinating anions (WCAs).

Aluminum chloride ($AlCl_3$) is the main acid catalyst (coinitiator) used in the production of butyl rubber despite numerous drawbacks. Under heterogeneous conditions, $AlCl_3$ is not an efficient acid coinitiator for isobutylene polymerization. Therefore, polymerization is conducted at ~−100° C. under slurry conditions using methyl chloride ($CH_3Cl$) as a polar solvent for $AlCl_3$, a diluent for the monomers/polymer, and as a heat sink. Despite the polar environment, low temperatures are still required for the production of high MW polymer ($\leq$−95° C. for $\overline{M}_v > 1 \times 10^6$ g·$mol^{-1}$) as the anions derived from $AlCl_3$ promote CT and thus polymerization is costly in terms of refrigeration. $CH_3Cl$ is toxic and requires special handling, further detracting from the utility of this process. Moreover, $AlCl_3$ has very limited solubility in $CH_3Cl$ and accurate determination of the concentration is difficult. This complicates metering a given quantity of $AlCl_3$ into the reactor and limits control over the polymerization process. Additionally, recycled $CH_3Cl$ must be freed of monomer impurities prior to reuse in the preparation of fresh $AlCl_3$ coinitiator solution as they oligomerize and coat the $AlCl_3$ preventing it from dissolving. Since the butyl product is insoluble in $CH_3Cl$, problems with reactor fouling arise requiring periodic shutdown and cleaning cycles leading to productivity losses and increased operation costs. Post polymerization functionalization (e.g. halogenation) of butyl also requires removal of $CH_3Cl$ and subsequent dissolution into an aliphatic hydrocarbon or other appropriate solvent increasing the number of processing steps. Impurities arising from $AlCl_3$ can interfere with such reactions. Finally, $AlCl_3$ remains trapped within the polymerization mixture necessitating deashing steps that destroy $AlCl_3$ and result in additional processing steps, energy consumption, and waste generation.

Numerous initiator systems involving homogeneous coinitiators have been devised in an attempt to overcome the negative aspects of $AlCl_3$ based polymerization. These systems can be categorized into six main subsets.

1. Initiator systems that employ a halogen bearing aluminum Lewis acid coinitiator exhibiting enhanced solubility characteristics.
2. Those involving soluble alkyl, alkoxy, amino, or oxy substituted Lewis acids in conjunction with other Lewis acids.
3. Those that employ an aluminum Lewis acid coinitiator that bears organic substituents, in particular trialkylaluminum compounds and diethylaluminum chloride ($Et_2AlCl$), in conjunction with an initiator component other than adventitious moisture.
4. Initiator systems containing WCAs based on alkylaluminoxanes or perfluoroarylated Lewis acids (PFLAs).
5. Initiator systems based on organo zinc halide coinitiators in conjunction with carbocation synthons.
6. Physical initiator systems (γ-radiation.).

One of the first effective homogenous systems explored involved the use of aluminum bromide ($AlBr_3$) in place of $AlCl_3$. In comparison to $AlCl_3$, $AlBr_3$ exhibits greater solubility in a wider range of solvents including hydrocarbons and polymerizations using the latter can be conducted under homogeneous conditions in nonpolar media avoiding requisite use of toxic $CH_3Cl$. Such polymerizations also give rise to higher MW butyl at a given reaction temperature in comparison to $AlCl_3$ despite being conducted under nonpolar reaction conditions and thus ease the refrigeration requirements necessary to produce a specific grade of polymer. Moreover, since polymerization is conducted in solution, problems with reactor fouling are avoided. Of the halogen bearing aluminum coinitiators, ethylaluminum dichloride ($EtAlCl_2$) is purported to yield highest MW polymers in $CH_3Cl$. $EtAlCl_2$ can also function in hydrocarbons and thus has many of the same benefits as $AlBr_3$. In particular, aqua adducts of alkylaluminum dihalides (e.g. $EtAlCl_2.OH_2$) are highly active for the production of high MW butyl at elevated temperatures in nonpolar solvents.

A large number of homogeneous initiator systems have been developed that involve the combination of multiple Lewis acids. These systems are interrelated in that most contain a Lewis acid component that bears either an alkyl group or heteroatom containing substituent (e.g. alkoxide, amide, or oxide) to improve the solubility and activity of more traditional halogen substituted Lewis acids. Kraus and Young/Kellog were the first to report the use of alkyl and alkoxy/oxy substituted Lewis acids (respectively) as adjuvants to improve the solubility and hence activity of acid metal halide coinitiators in the polymerization of isobutylene {e.g $Me_2AlCl+MeAlCl_2$; $Ti(OBu)_4+AlCl_3$}. Even though these polymerizations were conducted in $CH_3Cl$ at low temperatures (~−78° C.) MWs were reported to be low. As will be seen this is surprising since subsequent disclosures in the patent literature, in some cases using almost identical components under similar reaction conditions (e.g. Parker and coworkers {$Et_2AlCl+EtAlCl_2$}; Strohmayer and coworkers {$Et_3Al+TiCl_4$}), give rise to high MW products. The cause of such discrepancies may be attributed to the use of dry ice as an internal cooling agent as $CO_2$ is known to react with alkyl aluminum compounds, key components of these initiator systems. When the use of dry ice as an internal cooling agent is omitted a 9:1 molar mixture of $Et_2AlCl:EtAlCl_2$ gives rise to high MW butyl in hexane solution at temperatures in the vicinity of −70° C. Of further interest, it was later discovered that metal alkoxides, metal amides, and mixed metal oxide-metal alkoxides in conjunction with $BF_3$ are highly active for the production of high MW butyl in aliphatic solvents at high temperatures. For example, Group 8, 9, and 10 metal alkoxides {e.g., $Fe(OBu)_3$} in conjunction with $BF_3$ give rise to good yields of high MW PIB/butyl at elevated temperatures in hexanes. In a similar vein, alkoxy aluminum and titanium halides {e.g., $ClAl(O-sec-Bu)_2$; $Cl_3TiOBu$} also form very active initiator systems in conjunction with $BF_3$ that yield high MW polymers at elevated temperatures in nonpolar media. Mixed metal oxide-metal alkoxides {e.g., $Zn[OAl(OEt)_2]_2$} in conjunction with $BF_3$ were also found to exhibit similar behavior. In an analogous manner, alkoxy aluminum halides {e.g., $Cl_2AlOMe$}, and alkoxy alkyl aluminum halides {e.g., $EtAl(OEt)Cl$} in conjunction with a wide variety of halogen bearing Lewis acids (e.g., $TiCl_4$) give rise to high MW butyl at elevated temperatures although polymerization appears to require $CH_3Cl$. Likewise, metal (Zn, Al, Ti, Sn, Si, Zr, etc.) amide bearing Lewis acids {e.g., $Al(NEt_2)_3$} with $BF_3$ exhibit high activity for the production of high MW PIB/butyl in nonpolar solvents at elevated polymerization temperatures.

A great deal of research has been conducted on the use of $Et_2AlCl$ as a coinitiator in the polymerization of isobutylene. Unlike $EtAlCl_2$, $Et_2AlCl$ requires purposeful addition of an initiator component. Initiator components that have been found to be useful in combination with $Et_2AlCl$ include organic halide carbocation synthons (e.g. t-butyl chloride), hydrohalogen acids, halogens/interhalogens, electron acceptors (e.g. tetracyanoethylene), sulfur oxides, alkali and alkaline earth metal salts, as well as alkyl metal/semimetal halides, metal alkoxy halides, and metal oxy halides (e.g. $MeSiCl_3$, $Cl_3TiOBu$, $ZrOCl_2$). These systems all give rise to high MW grades of PIB/butyl, but from the published data, use of $CH_3Cl$ is a required in all cases. Triorganoaluminum compounds are active coinitiators for the production of high MW PIB at elevated temperatures in conjunction with initiators ranging from organic halide carbocation synthons (e.g. t-butyl chloride), hydrohalogen acids (e.g. HCl), and halogens/interhalogens (e.g. $Cl_2$) when used in polar solvents (e.g. $CH_3Cl$). The MWs of polymers produced by these systems for a given initiator are lower than those yielded by the corresponding $Et_2AlCl$ system at a specific polymerization temperature.

Initiator systems based on alkyl and aryl zinc halide coinitiators (e.g. EtZnCl) in conjunction with carbocation synthons (e.g. t-butyl Cl) afford high MW PIBs at elevated temperatures. Despite these benefits, such systems have little utility in that they only operate efficiently in polar solvents (e.g. $CH_2Cl_2$) and at temperatures>−35° C.

Physical initiator systems have also been developed for the polymerization of isobutylene. For example, γ-radiation provides highest MW polymers at a given temperature but requires monomer of such high purity as to be impractical to conduct on a commercial setting. The requisite use of high energy radiation also detracts from the utility of this process.

Recently a great deal of research has been conducted on initiator systems that contain WCAs. These systems can be classified into five distinct groups dependent on the mode of initiation and identity of the initiator system components.

1. Systems that give rise to protic initiation from Brönsted acids generated in situ by reaction of PFLAs {e.g. B$(C_6F_5)_3$; 1,2-$C_6F_4[B(C_6F_5)_2]_2$} or their salts {e.g. [Li]$^+$ [B$(C_6F_5)_4$]$^-$} with adventitious moisture.
2. Those systems that generate initiating carbocations from reaction of PLFAs or their salts with carbocation synthons (e.g. t-BuCl).
3. Ill-defined initiation processes involving in situ formation of silylium tetrakis(pentafluorophenyl)borate.
4. Direct or indirect (protic) initiation processes involving metal cations derived from transition metal complexes and PFLAs.
5. Systems derived from methylaluminoxane (MAO) in conjunction with an initiator.

With the exception of certain PFLA derived salts {i.e. trityl tetrakis(pentafluorophenyl)borate, [Ph$_3$C]$^+$[B$(C_6F_5)_4$]$^-$} these systems are capable of producing high MW polymer at elevated reaction temperatures. The primary drawbacks to the first four methods are the expense of the homogenous initiator components and their sensitivity to minute traces of impurities (e.g. moisture). Moreover, in some cases {B$(C_6F_5)_3$+ $H_2O$; B$(C_6F_5)_3$+2-chloro-2-phenyl propane (cumyl chloride)} polar solvents (e.g. $CH_3Cl$) are required to facilitate polymerization.

Systems based on MAO are superior to those that use PFLAs from a cost standpoint; however, active initiators appear to be limited to halogen bearing carbocation synthetic equivalents and adventitious moisture (see below) under nonpolar reaction conditions despite claims that other carbocation synthons containing groups that are typically ionizable (e.g. acyl halides and 3° ethers) are active as well. Moreover, these systems have limited activity at high reaction temperatures under nonpolar conditions and due to their homogeneous nature deashing steps are required. It should be noted that, in the systems $Et_2AlCl+EtAlCl_2$+MAO and $EtAlCl_2$+ MAO, the aluminoxane appears to function primarily as a scavenger of moisture and not necessarily as an actual coinitiator. This is most evident for the $EtAlCl_2$+MAO system where polymer MW increases while yield decreases and molecular weight distribution (MWD) narrows with increasing [MAO]. Such behavior is indicative that MAO is either scavenging the initiator (e.g. adventitious moisture present as $EtAlCl_2.OH_2$) and/or chain transfer agents (e.g. $H_2O$) thus lowering their overall concentration.

Despite the enormous amount of research it is evident that even the best homogeneous initiator systems still suffer in that deashing steps are required for removal of spent initiator components. As a result, a great deal of work has focused on developing initiator systems that use heterogeneous coinitiators. These systems can be grouped into seven main classes.

1. Silica and alumina supported $AlCl_3$.
2. Acidic inorganic solids (e.g. $MgCl_2$, clays, molecular sieves).
3. Inorganic solids containing intercalated Lewis acids.
4. Complex acidic solids from reaction of $Al(O-sec-Bu)_3$, $BF_3$, and $TiCl_4$.
5. Metal triflates, perchlorates and their supported analogs.
6. Mixed Lewis acids supported on inorganic oxides.
7. Polypropylene (PP) supported Al and B containing Lewis acids.

A tremendous amount of research has been conducted on silica and alumina supported $AlCl_3$ as heterogeneous Lewis acids. Two main approaches have been explored in an attempt to yield a support material bearing —$OAlCl_2$ groups. In one, $AlCl_3$ is reacted with a support material by dry mixing/pelletization, reaction under melt conditions, vapor phase reaction (e.g., sublimation), and solution reaction. A second approach involves reaction of alkylaluminum dihalides with the support. None of these materials are capable of producing high MW polymers at elevated temperatures.

Acid treated clays and activated 5-A molecular sieves have been explored as solid acid catalysts for cationic polymerization. The former were used in the preparation of low molecular weight styrenic resins and no information as to their utility in isobutylene polymerization was provided whereas the later are reported to yield low molecular weight PIBs at elevated temperatures in neat monomer after long reaction times. Thus, these materials are not useful for the preparation of high MW grades of PIB or butyl.

Freshly milled $CdCl_2$ layer structure dihalides (e.g., $MgCl_2$) are active coinitiators for IB yielding high MW polymers at elevated temperatures. Polar solvents (e.g. $CH_3Cl$) and careful manipulation of the moisture level are required for high activity thus limiting the utility of these systems. It was suggested that $Mg^{2+}$ generated during the milling process reacts with adventitious moisture to form a strong Brönsted acid that ultimately initiates polymerization.

Supported Lewis acids have been made by intercalating them within an inorganic metal dihalide (e.g., $MgCl_2$). The intercalation process involves application of a hydrocarbon soluble porogen (e.g., adamantane) in conjunction with the Lewis acid which are mixed together with the inorganic halide in the solid state followed by selective solvent extraction of the porogen. The resultant materials are active for polymerization of IB but yield only low MW materials at high temperatures and are not useful in the preparation of high MW PIB or butyl.

A complex solid Lewis acid coinitiator synthesized from $Al(O-sec-Bu)_3$, $BF_3$, and $TiCl_4$ is active for polymerization of IB to high MWs at elevated temperatures in aliphatic solvents. This was formed by initial reaction of $Al(O-sec-Bu)_3$ with $BF_3$ to form a precipitate that was then subsequently treated with $TiCl_4$ just prior to polymerization. Both the $Al(O-sec-Bu)_3/BF_3$ precipitate and its reaction product with $TiCl_4$ are thermally unstable and degrade with time even at temperatures <0° C. Both polymerization rate and polymer MW are adversely affected by aging of these materials limiting the usefulness of this system.

A variety of unsupported metal perchlorates and triflates have been explored for cationic polymerization under heterogeneous conditions. Of these only $Mg(ClO_4)_2$ was shown to give rise to high MW PIB at elevated temperatures (i.e. 0° C.) in neat monomer, albeit in low yields. Evidence for initiation by direct addition of monomer to exposed metal cations was gathered. Supported analogs of these materials have been described and can be synthesized by reacting a supported metal halide precursor (e.g., —$OAlCl_2$) with an appropriate Brönsted acid (e.g., $CF_3SO_3H$) to effect transesterification and formation of the corresponding metal triflate or perchlorate {e.g., —$OAl(CF_3SO_3)_2$}. These materials give rise to high yields of low MW PIBs exhibiting broad MWDs at elevated temperatures. Therefore, from the published data these materials are not suitable for the preparation of high MW grades of PIB or butyl.

Heterogeneous acid catalysts containing a mixture of weak and strong Lewis acid sites were made by first reacting alkyl substituted strong (e.g., $Et_2AlCl$) and weak (e.g., $MgBu_2$) Lewis acids with an inorganic support bearing hydroxyl groups. Any residual alkyl moieties of the supported acid sites were then converted to halogen substituents using halogens or alkyl halides to effect ligand exchange and yield a solid bearing strong (e.g., —$OAlCl_2$) and weak (e.g., —$OMgCl$) acid metal halides. These materials are active for the polymerization of isobutylene at elevated temperatures in nonpolar solvents; however, even though $\overline{M}_w$ is high MWD is abnormally broad limiting the utility of these systems.

Polypropylene (PP) and polybutene-1 (PB) substituted with —$OAlCl_2$, —$OAlClEt$, —$O(H)$—$BF_3$, and —$OBF_2$ groups are active Lewis acid coinitiators for isobutylene polymerization. PP and PB substituted with —$OAlCl_2$, —$OAlClEt$, —$O(H)$—$BF_3$ were made by reaction of hydroxyl functionalized PP and PB with $EtAlCl_2$, $Et_2AlCl$, and $BF_3$ (respectively) whereas —$OBF_2$ substituted PP was made by conversion of hydroxylated PP to a lithium alkoxide analog followed by subsequent reaction with $BF_3$. The —$OAlCl_2$, —$OAlClEt$ variants produce good yields of high MW polymers at elevated temperatures in polar (e.g. $CH_2Cl_2$) solvents. In nonpolar solvents they only produce polymers with low MWs. Polymers bearing —$O(H)$—$BF_3$ and —$OBF_2$ groups produce only low MW polymers. These coinitiators can be reused several times without apparent loss of activity. Although —$OAlCl_2$, —$OAlClEt$ functionalized PP are the most promising heterogeneous Lewis acid coinitiators disclosed to date their utility is hampered by the fact that they require polar solvents for the preparation of high MW grades of polymer and because the hydroxyl functionalized polymer support is not readily available and requires special/costly synthesis.

While numerous initiator systems have been researched and developed for the preparation of high MW polymers (such as, for example and in particular, butyl rubber and PIB) at elevated reaction temperatures under cationic conditions, none of these initiator systems address all, or even most, of the aforementioned deficiencies inherent in cationic polymerization. More particularly, no heterogeneous initiator system that is easy to manufacture and has convenient shelf stability has been known to produce polymers higher in MW than the present invention using the cationic polymerization of olefin monomers at elevated reaction temperatures (i.e. those temperatures above about −100° C.) without requiring the use of chlorinated solvents. Deleting the use of such chlorinated solvents will undoubtedly result in providing substantial savings in terms of both monetary costs as well as energy, and will reduce the impact on the use of such deleterious compounds on the environment.

Thus, there exists a need to provide a initiating system at a low cost that is capable of producing a polymer from one or more olefin monomers with a MW at least equal to and, in most cases, exceeding that which can be obtained from the aforementioned systems at a given temperature in the absence of chlorinated solvents. There is further a need to provide an initiating system in a form that is conducive to multiple batch and/or continuous polymerization processes and can be readily isolated from the reaction medium or products in order to minimize product purification steps and to minimize waste while maximizing economic and environmental benefits.

SUMMARY OF THE INVENTION

Any one or more of the foregoing aspects of the present invention, together with the advantages thereof over known art relating to initiator systems which will become apparent from the specification that follows, may be accomplished by the invention as hereinafter described and claimed.

The present invention provides a process for cationically polymerizing olefin monomers in a reaction mixture. The process comprises the step of contacting olefin monomers and a catalytically effective amount of an initiating composition containing (A) a heterogeneous Lewis acid coinitiator compound and (B) an initiator compound. The (A) heterogeneous Lewis acid coinitiator compound can be selected from the group consisting of (1) open chain and cyclic perfluoroaryl substituted aluminoxane compounds of formulas (I) and (II):

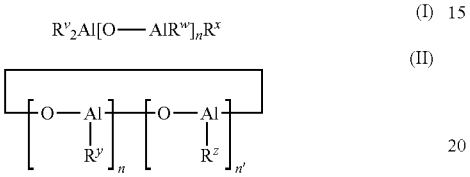

wherein (a) at least one of $R^v$, $R^w$, and $R^x$, if a formula (I) compound is used, and $R^y$, if a formula (II) compound is used, is a perfluoroaryl substituent, (b) at least one other of $R^v$, $R^w$, and $R^x$, if the formula (I) compound is used, and $R^z$, if a formula (II) compound is used, is selected from the group consisting of $C_1$-$C_{10}$ alkyls and a halide, (c) wherein, optionally, boron can be substituted for Al when bound to a perfluoroaryl substituent in both formula (I) and (II), (d) n is an integer from about 1 to about 40, (e) n' is an integer from about 1 to about 40; and (2) Group 13 perfluoroaryl Lewis acid compounds of the general formula (III):

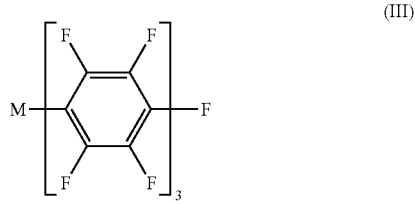

wherein M is a Group 13 element; and wherein the heterogeneous Lewis acid coinitiator compound is essentially insoluble in the reaction mixture and is supported on an inert substrate containing reactive functionalities that can chemically bind to the Lewis acid coinitiator compound. The (B) initiator compound can be selected from the group consisting of (i) organic compounds having the formula (IV):

wherein X is selected from the group consisting of halogens, $N_3$, CN, and $CF_3SO_3$ and $R^1$, $R^2$, and $R^3$ are selected from the group consisting of a hydrogen atom, halogens, $N_3$, $NO_2$, CN, $CF_3SO_3$, $SiR_3^4$, $OSiR_3^4$, $OR^4$, $C_1$-$C_{10}$ alkyl, $C_3$-$C_{10}$ cycloalkyl, $C_6$-$C_{18}$ aryl, combinations thereof, and derivatives thereof containing substituents thereof, including $R^1$ and $R^2$ or $R^1$, $R^2$, and $R^3$ being combined together so that they represent a single substituent wherein C is a member, and wherein each $R^4$ can be the same or different and is selected from the group consisting of a hydrogen atom, halogens, $N_3$, CN, $CF_3SO_3$, $C_1$-$C_{10}$ alkyl, $C_3$-$C_{10}$ cycloalkyl, $C_6$-$C_{18}$ aryl, combinations thereof, and derivatives thereof containing substituents thereof; and C is a carbon atom; (ii) halogens; (iii) interhalogens; (iv) BrOnsted acids, (v) boron halides; (vi) silicon compounds having the formula (V):

wherein X is selected from the group consisting of halogens, $N_3$, CN, $CF_3SO_3$, $SIR_3^4$, and $OSiR_3^4$; $R^1$, $R^2$, $R^3$ and each $R^4$ can be the same or different and is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Si is a member; and (vii) germanium compounds having the formula (VI):

wherein X is selected from the group consisting of halogens, $N_3$, CN, and $CF_3SO_3$; $R^1$, $R^2$, and $R^3$ is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Ge is a member. The foregoing process has the provisos that, 1) where the Lewis acid coinitiator is a Group 13 perfluoroaryl Lewis acid compound of formula (III), then the initiator is selected from (i) the organic compounds of formula (IV), under cationic polymerization reaction conditions; and 2) where M is Al or Ga as the Group 13 element, then the Lewis acid coinitiator compound may catalyze polymerization of the monomer via protic initiation under cationic polymerization conditions without purposeful addition of the initiator compound (B).

The present invention also provides an initiator system for use with a reaction mixture in the cationic polymerization of olefins. The initiator system comprises (A) a heterogeneous Lewis acid coinitiator compound and (B) an initiator compound. The (A) heterogeneous Lewis acid coinitiator compound can be selected from the group consisting of (1) open chain and cyclic perfluoroaryl substituted aluminoxane compounds of the formula (I) and (II):

-continued

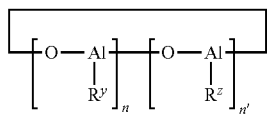

wherein (a) at least one of $R^v$, $R^w$, and $R^x$, if a formula (I) compound is used, and $R^y$, if a formula (II) compound is used, is a perfluoroaryl substituent, (b) at least one other of $R^v$, $R^w$, and $R^x$, if the formula (I) compound is used, and $R^z$, if a formula (II) compound is used, is selected from the group consisting of $C_1$-$C_{10}$ alkyls and a halide, (c) wherein, optionally, boron can be substituted for Al when bound to a perfluoroaryl substituent in both formula (I) and (II), (d) n is an integer from about 1 to about 40, (e) n' is an integer from about 1 to about 40; and (2) Group 13 perfluoroaryl Lewis acid compounds of the general formula (III):

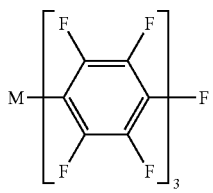

wherein M is a Group 13 element; and wherein the heterogeneous Lewis acid coinitiator compound is essentially insoluble in the reaction mixture and is supported on an inert substrate containing reactive functionalities that can chemically bind to the Lewis acid coinitiator compound. The (B) initiator compound can be selected from the group consisting of (i) organic compounds having the formula (IV):

$$R^1-\underset{\underset{R^3}{|}}{\overset{\overset{R^2}{|}}{C}}-X \quad \text{(IV)}$$

wherein X is selected from the group consisting of halogens, $N_3$, CN, and $CF_3SO_3$ and $R^1$, $R^2$, and $R^3$ are selected from the group consisting of a hydrogen atom, halogens, $N_3$, $NO_2$, CN, $CF_3SO_3$, $SiR_3^4$, $OSiR_3^4$, $OR^4$, $C_1$-$C_{10}$ alkyl, $C_3$-$C_{10}$ cycloalkyl, $C_6$-$C_{18}$ aryl, combinations thereof, and derivatives thereof containing substituents thereof, including $R^1$ and $R^2$ or $R^1$, $R^2$, and $R^3$ being combined together so that they represent a single substituent wherein C is a member, and wherein each $R^4$ can be the same or different and is selected from the group consisting of a hydrogen atom, halogens, $N_3$, CN, $CF_3SO_3$, $C_1$-$C_{10}$ alkyl, $C_3$-$C_{10}$ cycloalkyl, $C_6$-$C_{18}$ aryl, combinations thereof, and derivatives thereof containing substituents thereof; and C is a carbon atom; (ii) halogens; (iii) interhalogens; (iv) BrOnsted acids, (v) boron halides; (vi) silicon compounds having the formula (V):

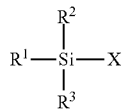

wherein X is selected from the group consisting of halogens, $N_3$, CN, $CF_3SO_3$, $SiR_3^4$, and $OSiR_3^4$; $R^1$, $R^2$, $R^3$ and each $R^4$ can be the same or different and is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Si is a member; and (vii) germanium compounds having the formula (VI):

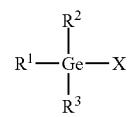

wherein X is selected from the group consisting of halogens, $N_3$, CN, and $CF_3SO_3$; $R^1$, $R^2$, and $R^3$ is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Ge is a member. The initiator system has the provisos that, 1) where the Lewis acid coinitiator is a Group 13 perfluoroaryl Lewis acid compound of formula (III), then the initiator is selected from (i) the organic compounds of formula (IV), under cationic polymerization reaction conditions; and 2) where M is Al or Ga as the Group 13 element, then the initiator may alternatively be a proton donor obtained from adventitious moisture or from the inert substrate.

Beneficially, the above initiator system can be used in the polymerization of olefin monomers without any requisite use of objectionable chlorinated solvents, and can be used at elevated temperatures well above those traditional temperatures used for polymerization in chlorinated solvents. The heterogeneous Lewis acid coinitiators of the initiator system of the present invention are amenable to multiple batch or continuous polymerization processes, are readily isolated from the reaction medium via filtration, and do not contaminate the reaction medium or product with free Lewis acids. Thus, waste is reduced, providing further cost and environmental benefits.

DETAILED DESCRIPTION OF THE PREFERRED EMBODIMENTS

In the present invention, the use of novel initiator systems containing supported, heterogeneous Lewis acids has been developed in the cationic polymerization of olefins. Unlike previously described heterogeneous systems, the process of the current invention readily gives rise to higher yields of high MW polymer, i.e., those polymers having a $\overline{M}_w$ of at least 100,000 g/mol, than previously employed polymerization processes, particularly those that used chlorinated solvents. Further, the process of the present invention can be conducted at reaction temperatures equal to or in excess of the temperatures that would have to be employed by other polymerization processes, including those that employ chlorinated solvents. In at least one embodiment, the present invention is devoid of any chlorinated solvents. In other words, the polymerization process of the present invention provides for the production of higher molecular weight polymers on a useful timescale, made from olefin monomers and a unique initiator system, at elevated temperatures compared to temperatures employed by other similar processes, those similar processes requiring the use of chlorinated solvents. In comparison to existing systems, the process of the present invention is superior in that it can be used in continual polymerization processes, is readily isolateable, and, by itself, does not contaminate the polymer product with free Lewis acid.

Further, it has been discovered that the supported heterogeneous Lewis acids display enhanced activity for cationic polymerization of olefins (especially at elevated polymerization temperatures under nonpolar reaction conditions) compared to non-supported heterogeneous Lewis acids. As a result, a lower overall concentration of Lewis acid is required for polymerizations using supported heterogeneous Lewis acids resulting in additional cost savings.

In at least one embodiment of the present invention, a process for cationically polymerizing olefin monomers in a reaction mixture is provided. The process comprises the step of contacting olefin monomers and a catalytically effective amount of an initiating composition. Non-limiting examples of olefin monomers suitable for use in the present invention include, but are not necessarily limited to, propylene, 1-butene, isobutylene, 2-methyl-1-butene, butadiene, isoprene, piperylene, 2,3-dimethylbutadiene, 2,4-dimethyl-1,3-pentadiene, cyclopentadiene, methylcyclopentadiene, limonene, myrcene, 1,3-cyclohexadiene, alpha and beta pinene, alpha-methyl styrene, styrene, p-methyl styrene, vinyl-toluene (and its isomers), divinylbenzene, indene, coumarone, methyl vinyl ether, ethyl vinyl ether, isobutyl vinyl ether, 4-vinybenzyl chloride, styrylethyltrimethoxysilane, and styrylethyltrichlorosilane. The initiating composition may contain one of two general classes or embodiments of initiator systems, each initiator system comprising a heterogeneous Lewis acid coinitiator and an initiator compound. In one embodiment, the Lewis acid coinitiator compound includes a perfluoroaryl substituent. In the other embodiment, the coinitiator compound is a perfluoroarylated Lewis acid (also known as a PFLA). In both embodiments, the Lewis acid coinitiator compound is chemically bound to an inert support.

In one of the two embodiments according to the concepts of the present invention, a heterogeneous, perfluoroaryl-substituted Lewis acid coinitiator may include an open chain aluminoxane compound or a cyclic aluminoxane compound. It will be understand that aluminoxane cage type cluster structures, such as hexamethyltetraaluminoxane, i.e. $[Al_4O_3(CH_3)_6]_4$, containing 4 and 3 coordinate Al or combinations thereof are included within the definition of "open chain and cyclic aluminoxane compounds". Aluminoxanes (or alumoxanes) are oligomeric aluminum-oxy compounds containing alternating aluminum and oxygen atoms where aluminum is typically substituted with an alkyl group. In the present invention, at least one of the alkyl substituents of the aluminoxane is replaced with a perfluoroaryl substituent. The aluminoxanes thus used in the present invention belong to a special class of aluminoxanes collectively known as perfluoroaryl substituted or modified aluminoxanes.

For the purposes of this invention, the term 'inert support' refers to either inorganic or organic substrates containing reactive functionalities (e.g. —OH, —SH, —$NH_2$, pyridine) that can form chemical bonds to select Lewis acidic compounds (i.e. perfluoroaryl substituted aluminoxanes, Group 13 PFLAs) to produce a heterogeneous Lewis acid capable of inducing cationic polymerization in conjunction with an appropriate initiator.

The inert support itself is incapable of inducing polymerization but instead enhances the activity of the supported Lewis acidic compound(s) that are bound to it. The inert support immobilizes the Lewis acid compounds(s) in such a manner that Lewis acidic species do not substantially leach into the reaction medium or reaction products. Thus, for purposes of the present invention, the phrase "essentially insoluble" means that the Lewis acid does not substantially dissolve or leach into the reaction medium or the reaction products, in contrast to soluble Lewis acids. Because they are essentially insoluble, the resultant heterogeneous Lewis acids can be used in multiple batch and continuous reaction processes and are recovered readily by simple filtration techniques. Furthermore, if the support can function as a filler and/or reinforcing agent then the heterogeneous Lewis acid coinitiator may be purposely left in the polymer product if desired in cases where doing so has a beneficial effect.

As noted above, the inert support may be an inert inorganic support or an inert organic support. The term 'inert inorganic support' refers to inorganic substrates (incapable of inducing polymerization alone) containing free hydroxyl groups that can react with select Lewis acidic compounds to form a heterogeneous Lewis acid coinitiator capable of inducing polymerization in conjunction with an appropriate initiator. They may include single and complex inorganic oxides, inorganic phosphates, metal hydroxides, hydrated metal halides, and functionalized carbonaceous materials. Non-limiting examples of inert inorganic supports include silica, alumina, fumed silica, fumed alumina, titania, magnesia, zirconia, zinc oxide, iron oxides, boron oxides, barium oxide, chromium oxides, manganese dioxide, silica-alumina, silica-titania, silica-magnesia, silica-alumina-zirconia, silica-alumina-thoria, crystalline aluminosilicates (e.g. synthetic {A, X, ZSM-5} and natural {faujasite, mordenite} zeolites; mesoporous molecular sieves {e.g. MCM-41}), open lattice clays (e.g. bentonite, montmorillonite), aluminophosphate, aluminum phosphate, metal hydroxides (e.g. zirconium hydroxide, indium hydroxide, boric acid), hydrated magnesium chloride, metal oxide gels or gel oxides (e.g. silica gel, silica-alumina gel), and functionalized carbon blacks {e.g. Cabot Corp. Ecoblack™ CRX™ carbon-silica dual phase fillers (CSDPF) 2000 and 4000 grades}.

The term 'inert organic support' refers to both naturally occurring and synthetic polymeric substrates (incapable of inducing polymerization alone) with reactive functionalities (e.g. —OH, —SH, —$NH_2$, pyridine) that can form chemical bonds to select Lewis acidic compounds (i.e. perfluoroaryl substituted aluminoxane compounds and Group 13 PFLAs) to form a heterogeneous Lewis acid coinitiator capable of inducing polymerization in conjunction with an appropriate initiator. Non-limiting examples of inert organic supports include polysaccharides (e.g. starches, cellulosic polymers {e.g. cotton}), phenolic resins (e.g. phenol-aldehyde), amino resins (e.g. urea-aldehyde), ion-exchange resins (e.g. amino, hydroxyl, and thiol functionalized divinylbenzene crosslinked polystyrenes), poly(allylamine), poly(4-vinyl phenol), poly(vinyl alcohol), polyethyleneimine, poly (acrylic acid) {and its carboxylate derivatives}, and poly(4-vinyl pyridine).

For the purposes of this invention, perfluoroaryl substituted aluminoxanes and/or Group 13 perfluoroarylated Lewis acids may be chemically bound to the inert support using a number of previously described approaches, many, which are summarized in Chem. Rev. 2005, 105, 4073-4147 and Chem.

Rev. 2000, 100, 1391-1434, both of which are incorporated herein by reference. One general approach for making supported perfluoroaryl substituted aluminoxanes involves first making a supported aluminoxane and then converting it into a supported perfluoroaryl substituted aluminoxane. Supported aluminoxanes can be made by a variety of methods. For example, as described in U.S. Pat. No. 6,043,180, incorporated herein by reference, calcined silica may be treated at room temperature with a hydrocarbon solution of methylaluminoxane (MAO), reduced to a solid and heated under vacuo, washed with hydrocarbon and then dried under vacuo to yield silica supported MAO. Another useful strategy, as detailed in U.S. Pat. No. 5,629,253 and as incorporated herein by reference, involves reaction of an alkylaluminum compound (e.g. trimethylaluminum) with a water impregnated (undehydrated) support material to produce a supported aluminoxane. Yet another useful method entails a slight modification of procedures disclosed in U.S. Pat. No. 6,136,742 and *Macromol. Rapid Commun.* 1998, 19, 505, both incorporated herein by reference. This modification involves pore filling an inorganic supported aluminoxane (e.g. silica supported MAO) with an organic monomer capable of undergoing crosslinking reactions (e.g. divinyl benzene) and then subjecting the resultant mixture to conditions conducive for either free radical (e.g. benzoyl peroxide/heat) or cationic (e.g. cumyl chloride) polymerization to yield an inorganic supported aluminoxane encapsulated in a crosslinked organic polymer. The supported aluminoxane can then be converted into a supported perfluoroaryl substituted aluminoxane by various previously described approaches some of which are described in *J. Mol. Cat. A: Chem.* 1998, 132, 231-239. Transformation of aluminoxane into perfluoroaryl substituted aluminoxane can be effected by transmetalation with $Al(C_6F_5)_3$ or $B(C_6F_5)_3$ in a hydrocarbon solvent. In the case of the later perfluoroaryl transfer agent, it is believed that $B(C_6F_5)$ moieties become incorporated into the aluminoxane structure. Moreover, as described in *J. Mol. Cat. A: Chem.* 1998, 132, 231-239 and WIPO Publication No. WO 99/15534 (published Apr. 1, 1999), a supported perfluoroaryl substituted aluminoxane can be made by first synthesizing perfluoroaryl substituted aluminoxane via the previously described transmetalation route and then contacted the reaction product with a support material in a hydrocarbon solvent followed by filtration and removal of volatiles under vacuo. A useful method for supporting Group 13 PFLAs, as detailed in *J. Mol. Cat. A: Chem.* 1999, 144, 137-150, *J. Mol. Cat. A: Chem.* 2002, 185, 167-177, and U.S. Pat. No. 6,900,154 and are herein incorporated by reference, involves reaction of a Group 13 PFLA with an inorganic support in an aromatic solvent either at room temperature or under reflux conditions followed by filtration, washing with additional solvent and then drying under vacuo to yield a supported Group 13 PFLA. Moreover, a useful method for preparing Group 13 PFLA salts is described in *J. Mol. Cat. A: Chem.* 1999, 146, 179-190 and incorporated herein by reference. An example of this approach involves stirring a suspension of support (i.e. silica) in hexanes with a mixture of $B(C_6F_5)_3$ and dimethylaniline followed by filtration, washing with additional solvent and then drying under vacuo to yield the silica supported dimethylanilium trisperfluorophenylborate salt {e.g. $[(SiO_2)_{50}B(C_6F_5)_3]^- [HNMe_2Ph]^+$}.

The weight percent of perfluoroaryl substituted aluminoxane or Group 13 PFLA relative to the total combined weight of perfluoroaryl substituted aluminoxane and support or Group 13 PFLA and support is dependent upon the identity of the support itself and may range from 1 wt % up to the threshold value for the support in question; above which, the support is saturated and cannot chemically bind additional perfluoroaryl substituted aluminoxane or Group 13 PFLA. Typically, the weight percent of perfluoroaryl substituted aluminoxane or Group 13 PFLA for such heterogeneous Lewis acids will range from 1-25 wt %.

In addition to the heterogeneous Lewis acid coinitiator, the initiator system also includes an initiator compound. There are a number of classes of initiator compounds that can be used. These classes of compounds include organic compounds represented by the formula (IV) hereinbelow, halogens, interhalogens, Brönsted acids, boron halides, silicon compounds represented by the formula (V) hereinbelow, and germanium compounds represented by the formula (VI) hereinbelow.

In one embodiment, a class of initiator compounds that can be utilized are the organic compounds represented by the formula (IV):

(IV)

wherein X is selected from the group consisting of halogens, $N_3$, CN, and $CF_3SO_3$ and $R^1$, $R^2$, and $R^3$ are selected from the group consisting of a hydrogen atom, halogens, $N_3$, $NO_2$, CN, $CF_3SO_3$, $SIR_3^4$, $OSiR_3^4$, $OR^4$, $C_1$-$C_{10}$ alkyl, $C_3$-$C_{10}$ cycloalkyl, $C_6$-$C_{18}$ aryl, combinations thereof, and derivatives thereof containing substituents thereof, including $R^1$ and $R^2$ or $R^1$, $R^2$, and $R^3$ being combined together so that they represent a single substituent wherein C is a member, and wherein each $R^4$ can be the same or different and is selected from the group consisting of a hydrogen atom, halogens, $N_3$, CN, $CF_3SO_3$, $C_1$-$C_{10}$ alkyl, $C_3$-$C_{10}$ cycloalkyl, $C_6$-$C_{18}$ aryl, combinations thereof, and derivatives thereof containing substituents thereof. C is a carbon atom. Non-limiting examples of compounds that would be included in this class of compounds are 2-chloro-2,4,4-trimethylpentane (TMPCl), t-butyl chloride, neopentyl chloride, 2-chloropropane, chloroform, carbon tetrachloride, and chloromethane.

In another embodiment, the initiator compound may include halogens. Suitable halogen compounds may include $F_2$, $Cl_2$, $Br_2$, or $I_2$. In another embodiment the initiator compound may include interhalogens, such as ClF, BrCl, ICl, or IBr. Further, in other embodiments, Brönsted acids may be employed as the initiator compound. Suitable Brönsted acids include but are not limited to: HCl, HBr, HI, $H_2SO_4$, $FSO_3H$, $CF_3SO_3H$, or $HClO_4$. In still other embodiments, a boron halide may be employed. Suitable boron halides include but are not limited to: $BBr_3$, $BCl_3$, or $BF_3$.

In yet another embodiment, silicon compounds can be employed as the initiator compound within the initiator system. For purposes of this invention, the term "silicon compound" refers silicon compounds represented by the formula (V),

(V)

wherein X is selected from the group consisting of halogens, $N_3$, CN, $CF_3SO_3$, $SiR_3^4$, and $OSiR_3^4$ and $R^1$, $R^2$, $R^3$ and each $R^4$ may be the same or different and selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof. Alternatively $R_1$ and $R_2$ or $R_1$, $R_2$, and $R_3$ may be combined together so that they represent a single substituent (e.g. ring) in which Si is a member. It will be appreciated that formula (V) parallels and is essentially the same formula as formula (IV), but that Si has been substituted for C. Suitable silicon compounds falling into this class of compounds would include the following examples: chlorotrimethylsilane, phenyldimethylchlorosilane, dichlorodimethylsilane, and tetrachlorosilane.

In yet another embodiment, germanium compounds can be employed as the initiator compound within the initiator system. For purposes of this invention, the germanium compounds are limited to those germanium compounds represented by the formula (VI),

wherein X is selected from the group consisting of halogens, $N_3$, CN, and $CF_3SO_3$; $R^1$, $R^2$, and $R^3$ is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof. Alternatively $R_1$ and $R_2$ or $R_1$, $R_2$, and $R_3$ may be combined together so that they represent a single substituent (e.g. ring) in which Ge is a member. It will be appreciated that formula (VI) parallels and is essentially the same formula as formula (IV), but that Ge has been substituted for C. Suitable germanium compounds falling into this class of compounds would include the following examples: chlorotrimethylgermane, phenyldimethylchlorogermane, dichlorodimethylgermane, and tetrachlorogermane.

In the second of the two embodiments according to the concepts of the present invention, a heterogeneous Lewis acid coinitiator may include a Group 13 PFLA corresponding for formula (III).

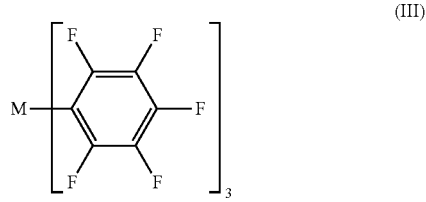

In addition, the heterogeneous Lewis acid coinitiator is essentially insoluble in the reaction mixture, and is chemically bound to an inert support (i.e. supported heterogeneous Lewis acid coinitiator).

The initiator system of this embodiment (the second of the two) also includes an initiator compound. The initiator compounds for use with these supported Lewis acid coinitiators are limited to those organic compounds of formula (IV) with the proviso that for where M=Al or Ga the initiator compound may also include a proton donor obtained from adventitious moisture of from the inert substrate.

In one embodiment according to the concepts of the present invention, the novel initiating systems are useful in the homo- and copolymerization of olefin monomers possessing at least one ethylenically unsaturated group capable of undergoing cationic polymerization. In one embodiment, the polymerization of the various useful olefin monomers noted above may be represented by the non-limiting generic structural formula (VII):

where X may include at least one of the following: halogen, $OR^5$, O, N, $SiR_3^5$, and $OSiR_3^5$, wherein each R may be the same or different and each of $R^1$, $R^2$, $R^3$, $R^4$ and $R^5$ may be a hydrogen atom, X, or any of the following (optionally substituted by X) but not limited to: $C_1$-$C_{10}$ alkyl, $C_3$-$C_{10}$ cycloalkyl, $C_6$-$C_{18}$ aryl, $C_2$-$C_8$ alkenyl, or $C_2$-$C_{10}$ alkyne. Alternatively $R^1$ and $R^2$, $R^3$ and $R^4$, $R^1$ and $R^3$, $R^2$ and $R^4$, may be combined together so that they represent a single substituent (e.g. ring) in which $C^1$ and/or $C^2$ are members.

Again, suitable olefin monomers include but are not limited to: propylene, 1-butene, isobutylene, 2-methyl-1-butene, butadiene, isoprene, piperylene, 2,3-dimethylbutadiene, 2,4-dimethyl-1,3-pentadiene, cyclopentadiene, methylcyclopentadiene, limonene, myrcene, 1,3-cyclohexadiene, alpha and beta pinene, alpha-methyl styrene, styrene, p-methyl styrene, vinyl-toluene (and its isomers), divinylbenzene, indene, coumarone, methyl vinyl ether, ethyl vinyl ether, isobutyl vinyl ether, 4-vinybenzyl chloride, styrylethyltrimethoxysilane, and styrylethyltrichlorosilane.

Polymerization may be performed in bulk, solution, suspension or in the gas phase and may be conducted in multiple or single stages. Any number of reactor geometries or types may be used including but not limited to: batch, stirred tank, fluidized bed, continuous tank, and tubular. Polymerization reaction temperatures can range from about −100° C. to about 100° C. and pressures can range from 0.01 bar to 1,000 bar. In one embodiment, the polymerization reaction temperature is greater than −80° C. In another embodiment, the polymerization reaction temperature is greater than −40° C. In another embodiment, the polymerization reaction temperature is greater than −20° C. In another embodiment, the polymerization reaction temperature is greater than 0° C. And in another embodiment, the polymerization reaction temperature is room temperature.

Monomer concentration may range from 1-100 vol % relative to the total volume of the polymerization reaction mixture depending upon the desired process conditions. In copolymerizations, the concentration of comonomer(s) can vary in any manner so as to give rise to a copolymer with desired physical properties. A "catalytically effective amount" of an initiating composition may be determined empirically by adjusting the concentration of both the initiator and the coinitiator with respect to monomer to the point that polymerization ceases to occur. When the concentrations of initiator and coinitiator are above such levels they are deemed to be present in a catalytically effective amount. In the case of isobutylene it has been found that 1 part by weight initiator in conjunction with 20 parts by weight unsupported coinitiator are well above what is considered to be a catalytically effective amount for the polymerization of 2,000 parts by weight monomer.

Depending on the process conditions, polymerizations involving initiator systems as described in both embodiments of the present invention (i.e. supported perfluoroaryl substituted aluminoxane and supported Group 13 PFLA) may be conducted in solvents or diluents that typically dissolve perfluoroaryl substituted aluminoxanes and Group 13 PFLAs. A non-limiting list of suitable solvents/diluents includes nitromethane, methyl chloride, chloroform, toluene, hexane, heptane, cyclohexane, and isopentane.

In the process according to the invention, the heterogeneous Lewis acid component is used in a molar ratio relative to the initiator component (mol heterogeneous Lewis acid: mol initiator) of 1:100 to 10,000:1. In one embodiment, the range is from about 1:10 to about 100:1. In another embodiment, the range is from about 1:1 to about 10:1. The initiator component concentration may range from about 1 M to about $10^{-7}$ M and is dependent upon the desired molecular weight of the polymer product.

In order to demonstrate the practice of the present invention, the following examples have been prepared and tested. The examples should not, however, be viewed as limiting the scope of the invention. The claims will serve to define the invention.

EXAMPLES

Materials

All reagents were obtained from commercial sources and used without further treatment unless indicated otherwise.

Monomers

CP grade isobutylene (IB) was used without further purification. Inhibited styrene (ST) was used as received whereas uninhibited styrene was prepared by washing three times with 10 wt % NaOH (aq) followed by four washings with deionized water and drying by storage over $CaCl_2$.

Initiators

Chlorotrimethylsilane (TMSCl) was purified by distillation (under $N_2$) with the first and last fractions being discarded. It was then freed on any residual HCl by subjecting it to three freeze/pump/thaw cycles prior to use. Phenyldimethylchlorosilane (cumyl silicon chloride, CSiCl) was freed of HCl by cooling to −78° C. and subjecting it to dynamic vacuum for 15 minutes prior to use. Boron tribromide was purified by subjecting it to three freeze/pump/thaw cycles, stirring over mercury in the dark, and placing it under dynamic vacuum (at −78° C.) for 15 minutes prior to use. Boron trichloride was purified by first subjecting it to three freeze/pump/thaw cycles followed by placing it under dynamic vacuum (at −78° C.) for 15 minutes prior to use. 1,4-Di-(1-chloro-1-methyl ethyl)benzene (dicumyl chloride {DCCl}) was made by hydrochlorination of α,α,α',α'-tetramethyl-1,4-benzene-dimethanol and stored at 0° C. prior to use. Cumyl methyl ether (CME) was synthesized by modification of an existing literature procedure involving reaction of potassium 2-phenyl-2-propoxide with methyl iodide in tetrahydrofuran. $B(C_6F_5)_3$ and $Ga(C_6F_5)_3$ were prepared according to a procedures detailed in U.S. Pat. No. 7,585,991. Ethyl bromide (EtBr), 2-bromobutane (2BrBu), 1,2-dichloroethane (1,2dClEt), dichloromethane, chloroform, and carbon tetrachloride were purified by three freeze/pump/thaw cycles followed by drying over 3 Å molecular sieves in the dark. Nitromethane (MeNO2) was purified by drying over 3 Å molecular sieves. Acetyl chloride was purified by distillation under nitrogen with the middle fraction being collected followed by three freeze/pump/thaw cycles prior to use. A solution of HCl in toluene was made by stirring a mixture of 2.00 mL concentrated HCl(aq) with 8.00 mL toluene for 2 hours at room temperature followed by removal of the aqueous layer and drying of the organic layer over calcium chloride prior to use.

Unsupported Coinitiators

Solid MAO was obtained by removal of free trimethylaluminum and solvent from a commercial solution of MAO in toluene under reduced pressure. An idealized formula weight of 58.01 g·mol$^{-1}$ was assigned to solid MAO.

Solvents n-Hexane (95%) was purified by distillation from sodium under nitrogen, the distillate being subjected to three freeze/pump/thaw cycles and stored over a mixture of activated 3 Å molecular sieves and alumina under nitrogen. Benzene (ACS reagent, ≧99%) was purified by distillation from potassium under nitrogen, the distillate was then subjected to three freeze/pump/thaw cycles and stored over a mixture of activated 3 Å molecular sieves and alumina under nitrogen. Toluene (Certified ACS) was distilled from sodium under nitrogen, the distillate was then subjected to three freeze/pump/thaw cycles and stored over a mixture of activated 3 Å molecular sieves and alumina under nitrogen. Tetrahydrofuran (THF, HPLC Grade) was distilled from sodium under nitrogen, subjected to three freeze/pump/thaw cycles and stored over a mixture of activated 3 Å molecular sieves and alumina under nitrogen.

Equipment

All air sensitive manipulations were carried out using standard Schlenk line techniques and glassware or carried out in a dry box under nitrogen. Polymerizations were conducted in glassware that was passivated by treatment with chlorotrimethylsilane. Isobutylene polymerizations were carried out in 3 oz pressure reaction bottles (PRB; Andrew's Glass Co.) fitted with a Swagelok assembly containing a quick connect monomer inlet, an injection port, a pressure gauge, and a pressure release valve. Styrene polymerizations were conducted in test tubes capped with rubber septa. For all polymerizations, cooling was accomplished by submerging the polymerization vessel in dry ice/solvent baths, in ice water baths, or in ambient temperature water baths depending on the desired temperature. Each polymerization reactor was equilibrated to the bath temperature for a minimum of 20 minutes (test tubes=10 minutes) prior to initiation of polymerization; however, due to a lack of internal cooling the actual reaction temperature for the majority of polymerizations quickly exceeded the initial temperature. This means that the MWs obtained from the provided examples actually do not represent the ultimate MWs that can be obtained from a given system at a specific temperature but are in fact are lower than those that could be obtained if proper provisions are made for efficient heat transfer. Even with the deficiencies present in terms of heat transfer management the MWs and yields in most cases exceed those that can be obtained in other previously described polymerization systems, even those that operate in chlorinated solvents. Extreme caution must be exercised when conducting these polymerizations as they are violently exothermic and present severe explosion hazards.

Instrumentation

Size exclusion chromatography (SEC) and static light scattering where used in molecular weight determinations. The instrumentation consisted of a Wyatt MiniDawn light scattering detector (calibrated by the Rayliegh ratio for toluene), a Wyatt ViscoStar viscometer, a Waters 410 differential refractometer, with columns (3 MZ SDplus, 5 μm linear, 300×8 mm) that were eluted with HPLC grade THF (1.0 mL·min$^{-1}$ 35° C.). Sample concentration varied from 10-15 mg·mL$^{-1}$ and the reported dn·dc$^{-1}$ value for polyisobutylene (0.11) was used in calculations.

Generic Screening Polymerization Procedure

Styrene polymerizations involving inhibited and uninhibited monomer were used for the purpose of screening a specific initiator system for activity. These experiments were conducted by charging a test tube with the desired coinitiator and a stir bar inside of a glove box, capping the tube with a rubber septum and charging it with monomer by syringe. The tube was submerged into a cooling bath for 10 minutes with stirring and then the initiator component was injected by syringe. The tube was held at the bath temperature for one hour after which the charge was warmed to room temperature by the addition of toluene or benzene (thermal quenching) followed filtration and evaporation of the solvent to leave solid polymer.

General IB Polymerization Procedure

Initiator systems that proved to be active for polymerization of styrene were used in the polymerization of isobutylene according to the following general procedure. The Lewis acid coinitiator and a magnetic stir bar were charged to a 3 oz PRB in a dry box. The reactor was next fitted with a Swagelok assembly, removed from the dry box, attached to the monomer tank, cooled to −78° C. for 20 minutes, and filled with a determined quantity of isobutylene. The reactor was held at the desired polymerization temperature for a period of 20 minutes (if different than −78° C.) and then the initiator component was injected. In most experiments an exothermic reaction ensued with a corresponding rise in pressure resulting in reflux of the monomer with concomitant production of solid polymer, sometimes within a second or two following injection. After injection of the initiator the reactor was held at the desired reaction temperature for a period of one hour. The Swagelok assembly was removed and the charge was warmed to room temperature by the addition of n-hexane or benzene. The reaction mixture was filtered and the solvent evaporated to leave solid polymer.

Example 1

Synthesis of SI 1700 Supported B(C$_6$F$_5$)$_3$ 10 wt %

Grace Davison SI 1700 silica gel was dried under dynamic vacuum at 250° C. for 3 hours prior to use. A Schlenk flask was then charged with 4.50 g dried SI 1700 and 0.50 g B(C$_6$F$_5$)$_3$. Next, 125 mL dry toluene was cannulated into the flask under nitrogen to produce a slurry. The flask was fitted with a reflux condenser and then the mixture was heated to reflux under dynamic nitrogen for a total of 8 hours. The mixture was allowed to cool to room temperature and was filtered, washed with 100 mL dry toluene, filtered again and then dried under dynamic vacuum at 80° C. for 2 hours to yield a white solid.

Styrene Polymerization Using Silica Supported B(C$_6$F$_5$)$_3$ in Conjunction with Organic Compounds (Run 1)

Inside a glove box a large test tube was charged with 0.250 g SI 1700 supported B(C$_6$F$_5$)$_3$ 10 wt % coinitiator and a stir bar. The tube was fitted with a rubber septum, removed from the dry box and 4.40 mL (4.00 g) inhibited styrene was injected into the tube which was then cooled to 0° C. for 10 minutes. Next, 0.250 mL (5.0×10$^{-5}$ mol) DCCl stock solution in hexane was injected and the charge turned orange-red in color. Polymerization was allowed to run 1 hour before quenching with methanol and precipitation of the polymer. The polymer was dissolved in toluene and the supported coinitiator was removed by centrifugation. The resultant polymer solution was evaporated to dryness to yield a solid polymer of percent 47.61% yield. The molecular weight was not determined. This result is surprising since unsupported B(C$_6$F$_5$)$_3$ is incapable of inducing cationic polymerization of other monomers (e.g. IB) in conjunction with carbocation synthons under nonpolar conditions (see background of the invention).

Example 2

Synthesis of SI 1700 Supported Ga(C$_6$F$_5$)$_3$ 20 wt %

Grace Davison SI 1700 silica gel was dried under dynamic vacuum at 250° C. for 3 hours prior to use. A Schlenk flask was then charged with 4.00 g dried SI 1700 and 1.00 g Ga(C$_6$F$_5$)$_3$. Next, 125 mL dry toluene was cannulated into the flask under nitrogen to produce a slurry. The flask was fitted with a reflux condenser and then the mixture was heated to reflux under dynamic nitrogen for a total of 8 hours. The mixture was allowed to cool to room temperature and was filtered, washed with 100 mL dry toluene, filtered again and then dried under dynamic vacuum at 80° C. for 2 hours to yield a white solid.

Styrene Polymerization Using Silica Supported Ga(C$_6$F$_5$)$_3$ in Conjunction with Adventitious Moisture (Run 2)

Inside a glove box a large test tube was charged with 0.100 g SI 1700 supported Ga(C$_6$F$_5$)$_3$ 20 wt % coinitiator and a stir bar. The tube was fitted with a rubber septum, removed from the dry box and 4.40 mL (4.00 g) inhibited styrene (cooled to 0° C.) was injected into the tube and immediately turned yellow. Polymerization was allowed to 1 hour before quenching with methanol and precipitation of the polymer. The polymer was dissolved in toluene and the supported coinitiator was removed by centrifugation. The resultant polymer solution was evaporated to dryness to yield a solid polymer of percent 65.98% yield. The molecular weight was not determined.

Example 3

Styrene Polymerization Using Silica Supported Ga(C$_6$F$_5$)$_3$ in Conjunction with Organic Compounds (Run 3)

Inside a glove box a large test tube was charged with 0.100 g SI 1700 supported Ga(C$_6$F$_5$)$_3$ 20 wt % coinitiator and a stir bar. The tube was fitted with a rubber septum, removed from the dry box and 4.40 mL (4.00 g) inhibited styrene (cooled to 0° C.) was injected into the tube. Next, 0.250 mL (2.0×10$^{-5}$ mol) DCCl stock solution in hexane was injected and the charge turned orange-red in color. Polymerization was allowed to run 1 hour before quenching with methanol and precipitation of the polymer. The polymer was dissolved in toluene and the supported coinitiator was removed by centrifugation. The resultant polymer solution was evaporated to dryness to yield a solid polymer of percent 44.75% yield. The molecular weight was not determined.

Although the present invention has been described in considerable detail with reference to certain embodiments, other embodiments are possible. Therefore, the spirit and scope of the appended claims should not be limited to the description of the embodiments contained herein.

What is claimed is:

1. A process for cationically polymerizing olefin monomers in a reaction mixture, the process comprising the steps of:

contacting olefin monomers and a catalytically effective amount of an initiating composition containing (A) a heterogeneous Lewis acid coinitiator compound selected from the group consisting of (1) open chain and cyclic, perfluoroaryl substituted aluminoxane compounds of the formulas (I) and (II):

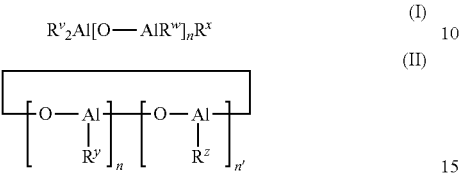

wherein (a) at least one of $R^v$, $R^w$, and $R^x$, if a formula (I) compound is used, and $R^y$, if a formula (II) compound is used, is a perfluoroaryl substituent, (b) at least one other of $R^v$, $R^w$, and $R^x$, if the formula (I) compound is used, and $R^z$, if a formula (II) compound is used, is selected from the group consisting of $C_1$-$C_{10}$ alkyls and a halide, (c) wherein, optionally, boron can be substituted for Al when bound to a perfluoroaryl substituent in both formula (I) and (II), (d) n is an integer from about 1 to about 40, (e) n' is an integer from about 1 to about 40; and (2) Group 13 perfluoroaryl Lewis acid compounds of the general formula (III):

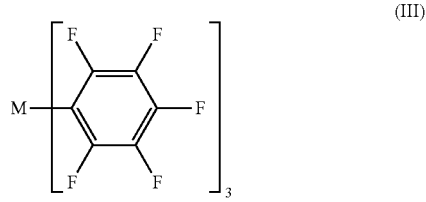

wherein M is a Group 13 element; and wherein the heterogeneous Lewis acid coinitiator compound is essentially insoluble in the reaction mixture and is supported on an inert substrate containing reactive functionalities that can chemically bind to the Lewis acid coinitiator compound; and (B) an initiator compound selected from the group consisting of (i) organic compounds having the formula (IV):

wherein X is selected from the group consisting of halogens, $N_3$, CN, and $CF_3SO_3$ and $R^1$, $R^2$, and $R^3$ are selected from the group consisting of a hydrogen atom, halogens, $N_3$, $NO_2$, CN, $CF_3SO_3$, $SIR_3^4$, $OSiR_3^4$, $OR^4$, $C_1$-$C_{10}$ alkyl, $C_3$-$C_{10}$ cycloalkyl, $C_6$-$C_{18}$ aryl, combinations thereof, and derivatives thereof containing substituents thereof, including $R^1$ and $R^2$ or $R^1$, $R^2$, and $R^3$ being combined together so that they represent a single substituent wherein C is a member, and wherein each $R^4$ can be the same or different and is selected from the group consisting of a hydrogen atom, halogens, $N_3$, CN, $CF_3SO_3$, $C_1$-$C_{10}$ alkyl, $C_3$-$C_{10}$ cycloalkyl, $C_6$-$C_{18}$ aryl, combinations thereof, and derivatives thereof containing substituents thereof; and C is a carbon atom; (ii) halogens; (iii) interhalogens; (iv) Brönsted acids, (v) boron halides; (vi) silicon compounds having the formula (V):

wherein X is selected from the group consisting of halogens, $N_3$, CN, $CF_3SO_3$, $SiR_3^4$, and $OSiR_3^4$; $R^1$, $R^2$, $R^3$ and each $R^4$ can be the same or different and is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Si is a member; and (vii) germanium compounds having the formula (VI):

wherein X is selected from the group consisting of halogens, $N_3$, CN, and $CF_3SO_3$; $R^1$, $R^2$, and $R^3$ is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Ge is a member;

with the provisos that, 1) where the Lewis acid coinitiator is a Group 13 perfluoroaryl Lewis acid compound of formula (III), then the initiator is selected from (i) the organic compounds of formula (IV), under cationic polymerization reaction conditions; and 2) where M is Al or Ga as the Group 13 element, then the Lewis acid coinitiator compound may catalyze polymerization of the monomer via erotic initiation under cationic polymerization conditions without purposeful addition of the initiator compound (B).

2. The process of claim 1, wherein the olefin monomers are selected from the group consisting of propylene, 1-butene, isobutylene, 2-methyl-1-butene, butadiene, isoprene, piperylene, 2,3-dimethylbutadiene, 2,4-dimethyl-1,3-pentadiene, cyclopentadiene, methylcyclopentadiene, limonene, myrcene, 1,3-cyclohexadiene, α- and β-pinene, α-methyl styrene, styrene, p-methyl styrene, vinyl-toluene, divinylbenzene, indene, coumarone, methyl vinyl ether, ethyl vinyl ether, isobutyl vinyl ether, 4-vinybenzyl chloride, styrylethyltrimethoxysilane, and styrylethyltrichlorosilane.

3. The process of claim 1, wherein the heterogeneous Lewis acid coinitiator is a perfluoroaryl substituted aluminoxane compound chemically attached to an inert inorganic support, which support is unable to induce polymerization by itself, and wherein the inert inorganic support is selected from the group consisting of silica, alumina, fumed silica, fumed alumina, titania, magnesia, zirconia, zinc oxide, iron oxides, boron oxides, barium oxide, chromium oxides, manganese dioxide, silica-alumina, silica-titania, silica-magnesia, silica-alumina-zirconia, silica-alumina-thoria, crystalline aluminosilicates, natural zeolites; mesoporous molecular sieves, open lattice clays, metal hydroxides, boric acid, hydrated magnesium chloride, metal oxide gels and gel oxides, and functionalized carbon blacks.

4. The process of claim 1, wherein the heterogeneous Lewis acid coinitiator is an perfluoroaryl substituted aluminoxane compound chemically attached to an inert organic support, which support is unable to induce polymerization by itself, and wherein the inert organic support is selected from the group consisting of polysaccharides, starches, cellulosic polymers, phenolic resins, phenol-aldehyde, amino resins, urea-aldehyde, ion-exchange resins, amino-, hydroxyl-, and thiol-functionalized divinylbenzene crosslinked polystyrenes, poly(allylamine), poly(4-vinyl phenol), poly(vinyl alcohol), polyethyleneimine, poly(acrylic acid) {and its carboxylate derivatives}, and poly(4-vinyl pyridine).

5. The process of claim 1, wherein the heterogeneous Lewis acid coinitiator is a Group 13 perfluoroaryl Lewis acid compound of formula (III) chemically attached to an inert inorganic support, which support is unable to induce polymerization by itself, and wherein the inert inorganic support is selected from the group consisting of silica, alumina, fumed silica, fumed alumina, titania, magnesia, zirconia, zinc oxide, iron oxides, boron oxides, barium oxide, chromium oxides, manganese dioxide, silica-alumina, silica-titania, silica-magnesia, silica-alumina-zirconia, silica-alumina-thoria, crystalline aluminosilicates, natural zeolites; mesoporous molecular sieves, open lattice clays, metal hydroxides, boric acid, hydrated magnesium chloride, metal oxide gels and gel oxides, and functionalized carbon blacks.

6. The process of claim 1, wherein the heterogeneous Lewis acid coinitiator is a Group 13 perfluoroaryl Lewis acid compound of formula (III) chemically attached to an inert organic support, which support is unable to induce polymerization by itself, and wherein the inert organic support is selected from the group consisting of polysaccharides, starches, cellulosic polymers, phenolic resins, phenol-aldehyde, amino resins, urea-aldehyde, ion-exchange resins, amino-, hydroxyl-, and thiol-functionalized divinylbenzene crosslinked polystyrenes, poly(allylamine), poly(4-vinyl phenol), poly(vinyl alcohol), polyethyleneimine, poly(acrylic acid) {and its carboxylate derivatives}, and poly(4-vinyl pyridine).

7. The process according to claim 1, wherein the cationic polymerization of the olefin monomer occurs in at least one polymerization step phase selected from the group consisting of bulk, solution, suspension, gas phase, and combinations thereof.

8. The process according to claim 1, wherein the cationic polymerization of the olefin monomer occurs at a temperature equal to or higher than that of an initiator system comprising a chlorinated solvent and produces a higher molecular weight polymer than does the polymerization of an olefin monomer in a chlorinated solvent.

9. The process according to claim 1, wherein the cationic polymerization of the olefin monomer occurs in the absence of any chlorinated solvent.

10. An initiator system for use with a reaction mixture in the cationic polymerization of olefins, the initiator system comprising:
   (A) a heterogeneous Lewis acid coinitiator compound selected from the group consisting of
   (1) open chain and cyclic aluminoxane compounds of the formula (I) and (II):

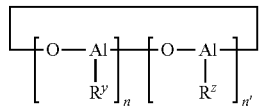

wherein (a) at least one of $R^v$, $R^w$, and $R^x$, if a formula (I) compound is used, and $R^y$, if a formula (II) compound is used, is a perfluoroaryl substituent, (b) at least one other of $R^v$, $R^w$, and Rx, if the formula (I) compound is used, and $R^z$, if a formula (II) compound is used, is selected from the group consisting of $C_1$-$C_{10}$ alkyls and a halide, (c) wherein, optionally, boron can be substituted for Al when bound to a perfluoroaryl substituent in both formula (I) and (II), (d) n is an integer from about 1 to about 40, (e) n' is an integer from about 1 to about 40; and
   (2) Group 13 perfluoroaryl Lewis acid compounds of the general formula (III):

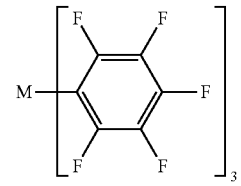

wherein M is a Group 13 element, and wherein the heterogeneous Lewis acid coinitiator is essentially insoluble in the reaction mixture and is supported on a inert substrate containing reactive functionalities that can chemically bind to the Lewis acid coinitiator compound; and
   (B) an initiator selected from the group consisting of
   (i) organic compounds having the formula (IV):

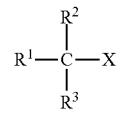

wherein X is selected from the group consisting of halogens, $N_3$, CN, and $CF_3SO_3$ and $R^1$, $R^2$, and $R^3$ are selected from the group consisting of a hydrogen atom, halogens, $N_3$, $NO_2$, CN, $CF_3SO_3$, $SiR_3^4$, $OSiR_3^4$, $OR^4$, $C_1$-$C_{10}$ alkyl, $C_3$-$C_{10}$ cycloalkyl, $C_6$-$C_{18}$ aryl, combinations thereof, and derivatives thereof containing substituents thereof, including $R^1$ and $R^2$ or $R^1$, $R^2$, and $R^3$ being combined together so that they represent a single substituent wherein C is a member, and wherein each $R^4$ can be the same or different and is selected from the group consisting of a hydrogen atom, halogens, $N_3$, CN, $CF_3SO_3$, $C_1$-$C_{10}$ alkyl, $C_3$-$C_{10}$ cycloalkyl, $C_6$-$C_{18}$ aryl, combinations thereof, and derivatives thereof containing substituents thereof; and C is a carbon atom;
   (ii) halogens;
   (iii) interhalogens;
   (iv) Brönsted acids;
   (v) boron halides;
   (vi) silicon compounds having the formula (V):

wherein X is selected from the group consisting of halogens, $N_3$, CN, $CF_3SO_3$, $SiR_3^4$, and $OSiR_3^4$; $R^1$, $R^2$, $R^3$ and each $R^4$ can be the same or different and is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Si is a member; and (vii) germanium compounds having the formula (VI):

wherein X is selected from the group consisting of halogens, $N_3$, CN, and $CF_3SO_3$; $R^1$, $R^2$, and $R^3$ is selected from the group consisting of a hydrogen atom, X, $C_1$-$C_{10}$ alkyl, $C_3$-$C_{10}$ cycloalkyl, $C_6$-$C_{18}$ aryl, combinations thereof and derivatives thereof containing substituents thereof, including $R^1$ and $R^2$ or $R^1$, $R^2$, and $R^3$ being combined together so that they represent a single substituent wherein Ge is a member; and with the provisos that, 1) where the Lewis acid coinitiator is a Group 13 perfluoroaryl Lewis acid compound of formula (III), then the initiator is selected from (i) the organic compounds of formula (IV), under cationic polymerization reaction conditions; and 2) where M is Al or Ga as the Group 13 element, then the initiator may alternatively be a proton donor obtained from adventitious moisture or from the inert substrate.

11. The initiator system of claim 10, wherein the heterogeneous Lewis acid coinitiator is an perfluoroaryl substituted aluminoxane compound chemically attached to an inert inorganic support, which support is unable to induce polymerization by itself, and wherein the inert inorganic support is selected from the group consisting of silica, alumina, fumed silica, fumed alumina, titania, magnesia, zirconia, zinc oxide, iron oxides, boron oxides, barium oxide, chromium oxides, manganese dioxide, silica-alumina, silica-titania, silica-magnesia, silica-alumina-zirconia, silica-alumina-thoria, crystalline aluminosilicates, natural zeolites; mesoporous molecular sieves, open lattice clays, metal hydroxides, boric acid, hydrated magnesium chloride, metal oxide gels and gel oxides, and functionalized carbon blacks.

12. The initiator system of claim 10, wherein the heterogeneous Lewis acid coinitiator is a perfluoroaryl substituted aluminoxane compound chemically attached to an inert organic support, which support is unable to induce polymerization by itself, and wherein the inert organic support is selected from the group consisting of polysaccharides, starches, cellulosic polymers, phenolic resins, phenol-aldehyde, amino resins, urea-aldehyde, ion-exchange resins, amino-, hydroxyl-, and thiol-functionalized divinylbenzene crosslinked polystyrenes, poly(allylamine), poly(4-vinyl phenol), poly(vinyl alcohol), polyethyleneimine, poly(acrylic acid) {and its carboxylate derivatives}, and poly(4-vinyl pyridine).

13. The initiator system of claim 10, wherein the heterogeneous Lewis acid coinitiator is a Group 13 perfluoroaryl Lewis acid compound of formula (III) chemically attached to an inert inorganic support, which support is unable to induce polymerization by itself, and wherein the inert inorganic support is selected from the group consisting of silica, alumina, fumed silica, fumed alumina, titania, magnesia, zirconia, zinc oxide, iron oxides, boron oxides, barium oxide, chromium oxides, manganese dioxide, silica-alumina, silica-titania, silica-magnesia, silica-alumina-zirconia, silica-alumina-thoria, crystalline aluminosilicates, natural zeolites; mesoporous molecular sieves, open lattice clays, metal hydroxides, boric acid, hydrated magnesium chloride, metal oxide gels and gel oxides, and functionalized carbon blacks.

14. The initiator system of claim 10, wherein the heterogeneous Lewis acid coinitiator is a Group 13 perfluoroaryl Lewis acid compound of formula (III) chemically attached to an inert organic support, which support is unable to induce polymerization by itself, and wherein the inert organic support is selected from the group consisting of polysaccharides, starches, cellulosic polymers, phenolic resins, phenol-aldehyde, amino resins, urea-aldehyde, ion-exchange resins, amino-, hydroxyl-, and thiol-functionalized divinylbenzene crosslinked polystyrenes, poly(allylamine), poly(4-vinyl phenol), poly(vinyl alcohol), polyethyleneimine, poly(acrylic acid) {and its carboxylate derivatives}, and poly(4-vinyl pyridine).

* * * * *